US009813933B2

(12) United States Patent
Sun et al.

(10) Patent No.: US 9,813,933 B2
(45) Date of Patent: Nov. 7, 2017

(54) MULTI-STREAM SERVICE CONCURRENT TRANSMISSION METHOD, SUBSYSTEM, SYSTEM AND MULTI-INTERFACE TERMINAL

(71) Applicant: ZTE CORPORATION, Shenzhen, Guangdong Province (CN)

(72) Inventors: Aifang Sun, Shenzhen (CN); Chong Gao, Shenzhen (CN); Zhihao Ling, Shenzhen (CN); Yifeng Yuan, Shenzhen (CN); Jianfu Cao, Shenzhen (CN); Zhifei Zhang, Shenzhen (CN); Xuewen Qi, Shenzhen (CN)

(73) Assignee: Xi'an Zhongxing New Software Co., Ltd., Xi'an (CN)

( * ) Notice: Subject to any disclaimer, the term of this patent is extended or adjusted under 35 U.S.C. 154(b) by 444 days.

(21) Appl. No.: 14/412,403

(22) PCT Filed: Jun. 26, 2013

(86) PCT No.: PCT/CN2013/077987
§ 371 (c)(1),
(2) Date: Dec. 31, 2014

(87) PCT Pub. No.: WO2013/185652
PCT Pub. Date: Dec. 19, 2013

(65) Prior Publication Data
US 2016/0007223 A1 Jan. 7, 2016

(30) Foreign Application Priority Data
Jul. 4, 2012 (CN) .......................... 2012 1 0229161

(51) Int. Cl.
G06F 15/16 (2006.01)
H04W 28/02 (2009.01)
H04L 29/06 (2006.01)
H04W 76/02 (2009.01)
(Continued)

(52) U.S. Cl.
CPC ......... *H04W 28/0215* (2013.01); *H04L 29/06* (2013.01); *H04L 47/125* (2013.01);
(Continued)

(58) Field of Classification Search
CPC ........................... H04L 47/125; H04L 65/601
See application file for complete search history.

(56) References Cited

U.S. PATENT DOCUMENTS

2005/0086254 A1* 4/2005 Zou .................... G06F 17/30097
2006/0193295 A1* 8/2006 White ................. H04L 12/5692
370/336

(Continued)

FOREIGN PATENT DOCUMENTS

| CN | 101594298 A | 12/2009 |
| CN | 102045776 A | 5/2011 |
| CN | 102209030 | 10/2011 |
| CN | 102209030 A | 10/2011 |
| KR | 20100058404 A | 6/2010 |

OTHER PUBLICATIONS

European Search Report dated May 11, 2015 in European Application No. 13804444.1.

*Primary Examiner* — Arvin Eskandarnia
*Assistant Examiner* — Austin Moreau
(74) *Attorney, Agent, or Firm* — Plumsea Law Group, LLC (57) ABSTRACT

A multi-stream service concurrent transmission method includes: a multi-interface terminal initiating a service transmission request to a network side; the multi-interface terminal receiving information of database servers capable of providing the requested service resources and service information of the requested service; the multi-interface terminal establishing a plurality of concurrent links with the database servers, dividing service data packets of the requested service, and notifying the network side of the division result; the multi-interface terminal receiving the service data pack- (Continued)

ets of the requested service via the plurality of established concurrent links. The embodiment of the present document further correspondingly discloses a multi-stream service concurrent transmission subsystem, system and a multi-interface terminal.

11 Claims, 7 Drawing Sheets (51) Int. Cl.
  *H04L 29/08* (2006.01)
  *H04L 12/803* (2013.01)
  *H04W 88/02* (2009.01)
(52) U.S. Cl.
  CPC .......... *H04L 65/601* (2013.01); *H04L 65/608* (2013.01); *H04L 67/10* (2013.01); *H04W 28/0205* (2013.01); *H04W 76/025* (2013.01); *H04W 88/02* (2013.01)

(56) References Cited

U.S. PATENT DOCUMENTS

| | | | |
|---|---|---|---|
| 2008/0125067 A1 | 5/2008 | Bells et al. | |
| 2009/0144792 A1 | 6/2009 | Fielibert et al. | |
| 2011/0258277 A1* | 10/2011 | Hu | H04L 12/1831 709/206 |
| 2014/0149556 A1* | 5/2014 | Pang | H04L 67/10 709/219 |
| 2014/0156809 A1* | 6/2014 | Fu | H04L 67/06 709/219 |

* cited by examiner

MULTI-STREAM SERVICE CONCURRENT TRANSMISSION METHOD, SUBSYSTEM, SYSTEM AND MULTI-INTERFACE TERMINAL

CROSS-REFERENCE TO RELATED APPLICATION(S)

This application is the U.S. National Phase application of PCT application number PCT/CN2013/077987 having a PCT filing date of Jun. 26, 2013, which claims priority of Chinese patent application 201210229161.9 filed on Jul. 4, 2012, the disclosures of which are hereby incorporated by reference.

TECHNICAL FIELD

The present document relates to the field of wireless communication technologies, and more particularly, to a multi-stream service concurrent transmission method, subsystem, system, and multi-interface terminal.

BACKGROUND OF THE INVENTION

With the development of heterogeneous network integration technology, the multi-interface terminal device with a variety of network access capabilities is increasingly popular, various interfaces of the multi-interface terminal cooperating to perform service transmission becomes an effective mode which fully uses the network resources, reasonably balances the loads, improves the transmission efficiency and the user QoS experience.

According to the abovementioned technical requirements, the technical scheme proposed in the related art is mainly to modify the existing network architecture and add a functional entity (radio resource management apparatus) on the network side, to distribute the traffic by comprehensively considering factors such as network bandwidth, service type and so on, and the traffic is aggregated via different paths to the multi-interface terminal side. However, on the one hand, the abovementioned technical scheme does not have the universality and is difficult to be implemented due to the need to add different functional entities aiming to different network architectures; on the other hand, the traffic distribution decision-making is completed by the network side, but since the network side cannot promptly perceive changes in the multiple-interface terminal environment, it is difficult to make a timely response and strategy adjustment, which tends to lead to relatively poor robustness of the traffic distribution strategy.

SUMMARY OF THE INVENTION

In view of this, the main objective of an embodiment of the present document is to provide a multi-stream service concurrent transmission method, subsystem, system, and multi-interface terminal, to solve the problem that the universality and robustness of the multi-stream service are relatively poor in the related art.

To achieve the abovementioned objective, the technical scheme in accordance with the embodiment of the present document is achieved as:

a multi-stream service concurrent transmission method, comprising:

a multi-interface terminal initiating a service transmission request to a network side, wherein the service transmission request carries at least a service ID of requested service and a terminal ID of the multi-interface terminal;

the multi-interface terminal receiving information of database servers capable of providing requested service resources and service information of the requested service from the network side;

the multi-interface terminal establishing a plurality of concurrent links with all or some of database servers corresponding to the information of the database servers capable of providing the requested service resources according to the information of the database servers capable of providing the requested service resources, and dividing service data packets of the requested service according to the service information of the requested service, and notifying the network side of a division result;

the multi-interface terminal receiving the service data packets of the requested service over the plurality of established concurrent links.

After the multi-interface terminal receives the service data packets of the requested service over the plurality of established concurrent links, the method further comprises:

the multi-interface terminal buffering the received service data packets in a buffer, wherein the service data packets carry service sequence numbers;

the multi-interface terminal combining the various service data packets according to the service sequence numbers of various service data packets in the buffer.

The method further comprises:

the multi-interface terminal evaluating links which transmit the service data packets;

the multi-interface terminal determining a link transmission rate adjustment strategy according to a evaluation result, and notifying the network side of the link transmission rate adjustment strategy for the network side to adjust transmission rates of various links.

The multi-interface terminal dividing the service data packets of the requested service according to the service information of the requested service as follows:

the multi-interface terminal dividing the service data packets according to one or more of the following items: service size, service type, the number of concurrent links, and buffer size.

The multi-interface terminal evaluates the links transmitting the service data packets as follows:

calculating path weights of various links which transmits the service data packets according to $$\text{Weight} = \frac{\alpha}{B_i(t)} + \beta RTT_i(t) + \gamma Loss_i(t),$$

wherein $B_i(t)$ is a bandwidth estimation value of the link i at time t, $B_i(t)=\lambda B_i(t-1)+(1-\lambda)s_i(t)$, $$s_i(t) = \frac{O_i(t)}{\max(RTT_i, 50 \text{ ms})},$$

wherein $O_i(t)$ is a total amount of data sent from time t−1 to time t, and $\lambda$ is a filtering factor, $RTT_i(t)$ is an average round-trip time delay of the link i at the time t, $Loss_i(t)$ is a retransmission statistical value of the link i at the time t, the coefficients $\alpha$, $\beta$ and $\gamma$ represent service grade information and the preference of the transmitted service to various performance parameters of the link.

The embodiment of the present document further provides a multi-stream service concurrent transmission method, comprising:

a service platform receiving a service transmission request from a multi-interface terminal, and inquiring a Tracker server for information of database servers capable of providing service resources requested by the multi-interface terminal and service information of a service requested by the multi-interface terminal according to a service ID, carried in the service transmission request, of the service requested by the multi-interface terminal;

the service platform returning the information of the database servers capable of providing the service resources requested by the multi-interface terminal as well as the service information of the service requested by the multi-interface terminal to a corresponding multi-interface terminal according to a terminal ID carried in the service transmission request;

the service platform receiving a division result which comes from the multi-interface terminal by dividing service data packets of the requested service;

the service platform controlling various database servers which establish concurrent links with the multi-interface terminal to send service data packets of the service resources requested by the multi-interface terminal to the multi-interface terminal according to the division result.

The method further comprises:

the service platform receiving a link transmission rate adjustment strategy from the multi-interface terminal;

the service platform controlling related database servers to adjust transmission rates of corresponding links according to the link transmission rate adjustment strategy.

A multi-interface terminal comprises: a service transmission request initiating module, a receiving module, a link establishing module, a service data packet dividing module and a transmitting module; wherein the service transmission request initiating module is configured to initiate a service transmission request to a network side, wherein the service transmission request carries at least a service ID of requested service and a terminal ID of the multi-interface terminal;

the receiving module is configured to receive information of database servers capable of providing requested service resources and service information of the requested service from a network side; and receive service data packets of the requested service via a plurality of concurrent links established by the link establishing module;

the link establishing module is configured to establish a plurality of concurrent links with all or some of database servers corresponding to the information of the database servers capable of providing the requested service resources according to the information of the database servers capable of providing the requested service resources;

the service data packet dividing module is configured to divide service data packets of the requested service according to the service information of the requested service;

the transmitting module is configured to notify the network side of a division result of the service data packet dividing module.

The multi-interface terminal further comprises: a buffer and a service data packet merging module; wherein the buffer is configured to buffer service data packets received by the receiving module, wherein the service data packets carry service sequence numbers;

the service data packet merging module is configured to merge various service data packets in accordance with service sequence numbers of the various service data packets in the buffer.

The multi-interface terminal further comprises an evaluating module and a link transmission rate adjustment strategy determining module; wherein the evaluating module is configured to evaluate links transmitting the service data packets;

the link transmission rate adjustment strategy determining module is configured to determine a link transmission rate adjustment strategy according to an evaluation result of the evaluating module;

the transmitting module is further configured to notify the network side of the link transmission rate adjustment strategy determined by the link transmission rate adjustment strategy determining module.

The service data packet dividing module is configured to divide the service data packets of the requested service according to the service information of the requested service, comprising:

dividing the service data packets according to one or more of the following items: service size, service type, the number of concurrent links and buffer size.

The evaluating module is configured to evaluate the links transmitting the service data packets, comprising:

calculating path weights of various links which transmits the service data packets according to $$\text{Weight} = \frac{\alpha}{B_i(t)} + \beta RTT_i(t) + \gamma Loss_i(t),$$

wherein $B_i(t)$ is a bandwidth estimation value of the link i at time t, $B_i(t)=\lambda B_i(t-1)+(1-\lambda)s_i(t)$, $$s_i(t) = \frac{O_i(t)}{\max(RTT_i, 50 \text{ ms})},$$

wherein $O_i(t)$ is a total amount of data sent from time t−1 to time t, and $\lambda$ is a filtering factor, $RTT_i(t)$ is an average round-trip time delay of the link i at the time t, $Loss_i(t)$ is a retransmission statistical value of the link i at the time t, the coefficients $\alpha$, $\beta$ and $\gamma$ represent the preference of the transmitted service to various performance parameters of the link as well as service grade information.

A service platform, comprising:

a receiving module, which is configured to receive a service transmission request from a multi-interface terminal, and receives a division result which comes from the multi-interface terminal by dividing service data packets of the requested service;

an inquiring module, configured to inquire a Tracker server for information of database servers capable of providing service resources requested by the multi-interface terminal and service information of the service requested by the multi-interface terminal according to a service ID, carried in the service transmission request, of the service requested by the multi-interface terminal;

a first transmitting module, configured to, according to a terminal ID carried in the service transmission request, return the information of the database servers capable of providing the service resources requested by the multi-interface terminal and the service information of the service requested by the multi-interface terminal to a corresponding multi-interface terminal;

a second transmitting module configured to, together with various database servers which establish concurrent links with the multi-interface terminal, send the service data packets of the service resources requested by the multi-interface terminal to the multi-interface terminal according to the division result.

The service platform further comprises:

a strategy adjusting module, configured to control related database servers to adjust transmission rates of corresponding links according to the link transmission rate adjustment strategy;

the receiving module, further configured to receive the link transmission rate adjustment strategy from the multi-interface terminal.

A multi-stream service concurrent transmission subsystem comprises: the abovementioned service platform, a Tracker server and at least one database server; wherein the Tracker server is configured to provide the service information and the information of the database servers of the service resources to the service platform;

the database server is configured to provide the multi-interface terminal with the service resources according to a notification from the service platform.

A multi-stream service concurrent transmission method, subsystem, system and multi-interface terminal is provided in accordance with the embodiment of the present document, and the multi-interface terminal initiates a service transmission request to the network side, wherein the service transmission request carries at least the service ID of the requested service and the terminal ID of the multi-interface terminal; the multi-interface terminal receives the information of the database servers capable of providing the requested service resources as well as the service information of the requested service from the network side; the multi-interface terminal establishes a plurality of concurrent links with all or some of the database servers corresponding to the information of the database servers capable of providing the requested service resources according to the information of the database servers capable of providing the requested service resources, as well as divides the service data packets of the requested service according to the service information of the requested service, and notifies the network side of the division result; the multi-interface terminal receives the service data packets of the requested service over the plurality of established concurrent links. The embodiment of the present document performs traffic distribution transmission based on the decision of the multi-interface terminal, and there is no need to add different functional entities aiming to different network architectures on the network side, therefore the universality is relatively high, moreover the multi-interface terminal can promptly perceive changes in the multi-interface terminal environment and make timely response and strategy adjustment, therefore the robustness of distribution strategy is relatively high.

BRIEF DESCRIPTION OF THE DRAWINGS

The accompanying drawings described herein are used to provide a further understanding of the embodiments of the present document and constitute a part of the present application, the exemplary embodiments of the present document and their description are used to explain the present document, and do not constitute an improper restriction on the present document. In the accompanying drawings.

PREFERRED EMBODIMENTS OF THE INVENTION

In the embodiment of the present document: a multi-interface terminal initiates a service transmission request to the network side, wherein the service transmission request carries at least the service ID of the requested service and the terminal ID of the multi-interface terminal; the multi-interface terminal receives the information of database servers capable of providing the requested service resources and service information of the requested service from the network side; the multi-interface terminal establishes a plurality of concurrent links with all or some of the database servers corresponding to the information of the database servers capable of providing the requested service resources according to the information of the database servers capable of providing the requested service resources, as well as divides the service data packets of the requested service according to the service information of the requested service, and notifies the network side of the division result; the multi-interface terminal receives the service data packets of the requested service over the plurality of established concurrent links.

Figure 1:
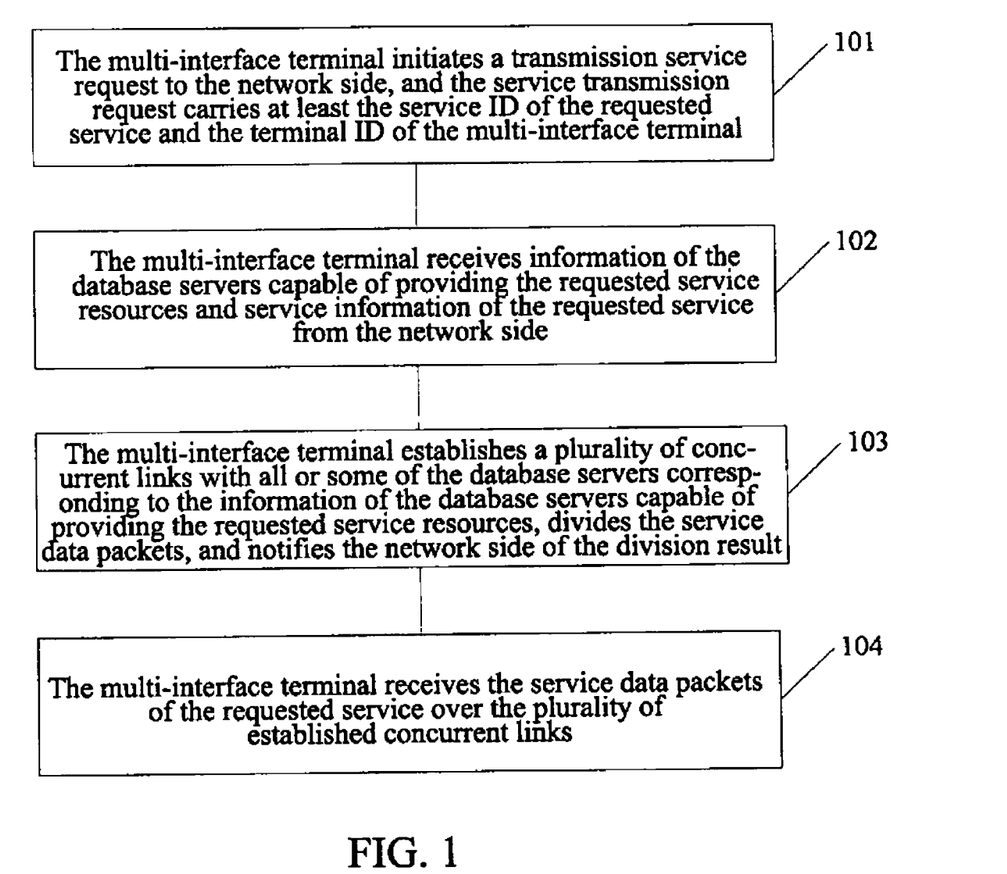
FIG. 1 is a schematic diagram of the process of a multi-stream service concurrent transmission method in accordance with an embodiment of the present document.

FIG. 1 is a schematic diagram of the process of a multi-stream service concurrent transmission method in accordance with an embodiment of the present document, and as shown in FIG. 1, the method comprises:

step 101: the multi-interface terminal initiates a transmission service request to the network side, and the service transmission request carries at least the service ID of the requested service and the terminal ID of the multi-interface terminal;

Herein, the multi-interface terminal has the capability to access a plurality of heterogeneous networks and it has at least two interfaces and can connect with the service platform via different access points, wherein the interfaces include, but not limited to, WLAN interface, Bluetooth interface, 3G interface and so on, and there are corresponding functional entities in the multi-interface terminal device to effectively manage various interfaces.

Step 102: the multi-interface terminal receives information of the database servers capable of providing the requested service resources and service information of the requested service from the network side;

Herein, the service information may comprise service type, service size and so on, and if the service comprises a plurality of sub-services, it also needs to describe the sub-service information.

Step 103: the multi-interface terminal establishes a plurality of concurrent links with all or some of the database servers corresponding to the information of the database servers capable of providing the requested service resources according to the information of the database servers capable of providing the requested service resources, divides the service data packets of the requested service according to the service information of the requested service and notifies the network side of the division result;

it should be noted that, the multi-interface terminal needs to send the IP address and port information of its own respective interfaces to the network side before the database servers establish a plurality of concurrent links, and alternatively, the port information and IP addresses of various interfaces can be carried in the service transmission request. Preferably, the multi-interface terminal preferably selects the database servers with relatively light load to establish a plurality of concurrent links.

Alternatively, the multi-interface terminal dividing the service data packets of the requested service according to the service information of the requested service can be as follows: the multi-interface terminal dividing the service data packets according to one or more of the following items: service size, service type, the number of concurrent links, and buffer size. It should be noted that different service types may correspond to different transmission real-time requirements. For example, the service can be equally divided into a plurality of service data packets according to the service size; for services with high transmission real-time requirements, the service data packets should be divided in relatively smaller size, while for services with low transmission real-time requirements, the service data packets can be divided in relatively larger size; when the number of concurrent links is large, the service data packets can be divided in relatively smaller size, and when the number of concurrent links is small, the service data packets can be divided in relatively larger size; when the buffer is large, the service data packets can be divided in relatively larger size, and when the buffer is small, the traffic packets can be divided in relatively smaller size. Preferably, for general services, the size of the service data packets is appropriately controlled in the range of 50 KB-500 KB.

Step 104: the multi-interface terminal receives the service data packets of the requested service over the plurality of established concurrent links.

Figure 2:
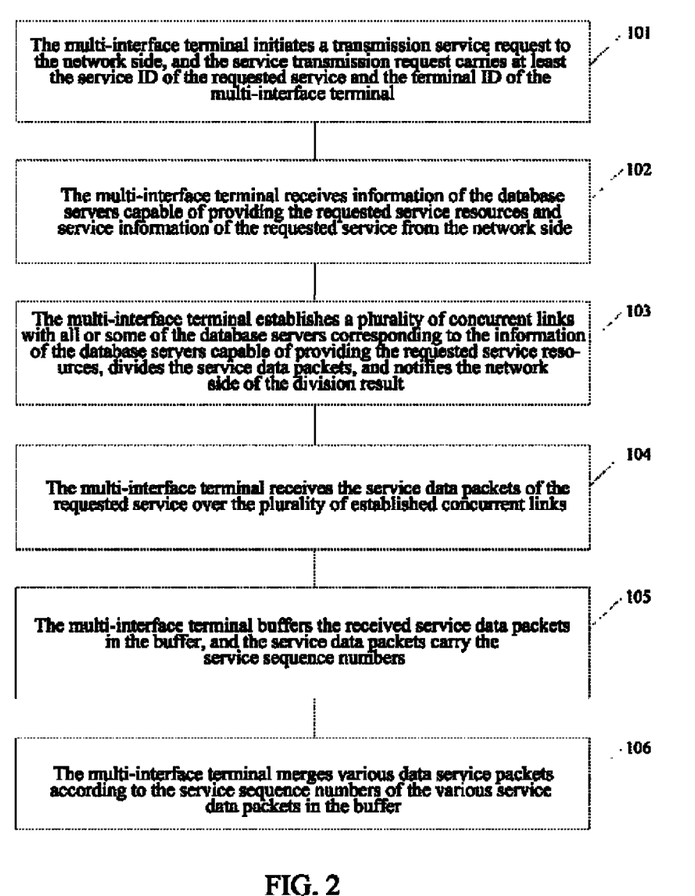
FIG. 2 is a schematic diagram of the process of another multi-stream service concurrent transmission method in accordance with an embodiment of the present document.

Alternatively, as shown in FIG. 2, after step 104, the method further comprises:

step 105: the multi-interface terminal buffers the received service data packets in the buffer, and the service data packets carry the service sequence numbers;

step 106: the multi-interface terminal merges various data service packets according to the service sequence numbers of the various service data packets in the buffer.

Figure 3:
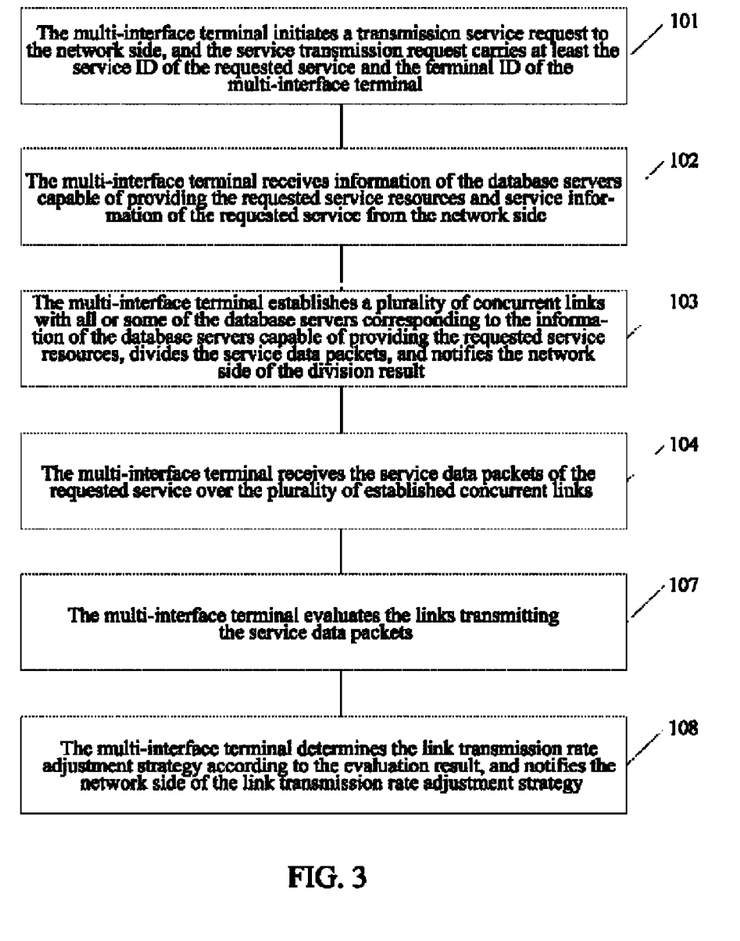
FIG. 3 is a schematic diagram of the process of still another multi-stream service concurrent transmission method in accordance with an embodiment of the present document.

Alternatively, as shown in FIG. 3, after step 104, the method further comprises:

step 107: the multi-interface terminal evaluates the links transmitting the service data packets;

step 108: the multi-interface terminal determines the link transmission rate adjustment strategy according to the evaluation result, and notifies the network side of the link transmission rate adjustment strategy.

For example, after the multi-interface terminal evaluates the links transmitting the service data packets, it knows that the link A has relatively poor link performance while the link B and link C have relatively good link quality, then it can decide to decrease the transmission rate of the link A and increase the transmission rates of the link B and the link C.

It should be noted that, the multi-interface terminal evaluating the links transmitting the service data packets may be as follows:

calculating the path weight of each link transmitting the service data packets according to $$\text{Weight} = \frac{\alpha}{B_i(t)} + \beta RTT_i(t) + \gamma Loss_i(t),$$

wherein $RTT_i(t)$ is the average round-trip time delay of the link i at the time t, $Loss_i(t)$ is the retransmission statistical value of the link i at the time t, the coefficients $\alpha$, $\beta$ and $\gamma$ represent the preference of the transmitted service to the various performance parameters of the link as well as the service grade information and are generated by the fuzzy multi-attribute decision-making cooperating with the user strategy which has already been determined, $B_i(t)$ is the bandwidth estimation value of the link i at the time t and the sample estimation can be performed according to the value of SACK returned by the receiving end in the transport protocols (SCTP, MTCP and other transport protocols supporting the multi-stream concurrent transmission) as follows:

$$s_i(t) = \frac{O_i(t)}{\max(RTT_i, 50 \text{ ms})},$$

$O_i(t)$ is the total amount of data transmitted from the time t−1 to the time t, to achieve dynamic bandwidth estimation, the bandwidth value at the time t−1 is used to correct the bandwidth value at the time t:

$B_i(t)=\lambda B_i(t-1)+(1-\lambda)s_i(t)$, wherein $\lambda$ is the filtering factor.

The service data packets arrive at the transmitting end and are distributed to different links for data transmission through the values of parameters of the weights of various links, which can maximize the utilization of network resources and achieve the optimal configuration of the network.

Alternatively, after step 101, the method further comprises:

the service platform receiving the service transmission request;

the service platform inquiring the Tracker server for information of the database servers capable of providing the service resources requested by the multi-interface terminal and the service information of the service requested by the multi-interface terminal according to the service ID, carried in the service transmission request, of the service requested by the multi-interface terminal;

the service platform returning the information of the database servers capable of providing the service resources requested by the multi-interface terminal and the service information of the service requested by the multi-interface terminal to the corresponding multi-interface terminal according to the terminal ID carried in the service transmission request.

Alternatively, after step 103, the method further comprises:

the service platform receiving the division result;

the service platform controlling the various database servers which establish concurrent links with the multi-interface terminal to send the service data packets of the service resources requested by the multi-interface terminal to the multi-interface terminal according to the division result.

Alternatively, after the multi-interface terminal notifies the network side of the link transmission rate adjustment strategy, the method further comprises:

the service platform receiving the link transmission rate adjustment strategy;

the service platform controlling the related database servers to adjust the transmission rates of the corresponding links according to the link transmission rate adjustment strategy, so as to achieve the load balancing of the service in various transmission links.

Figure 4:
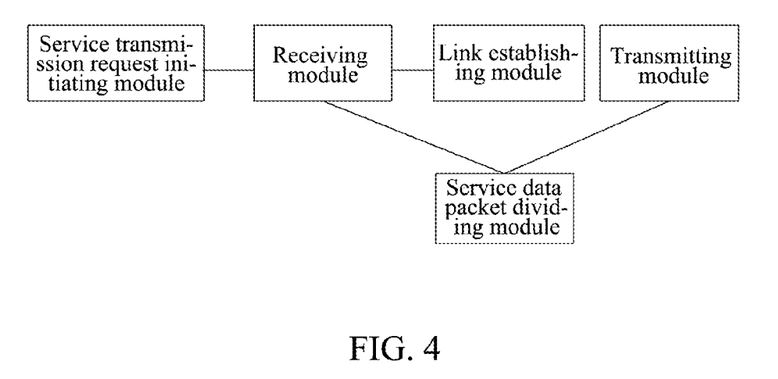
FIG. 4 is a schematic diagram of the structure of a multi-interface terminal in accordance with an embodiment of the present document.

The embodiment of the present document further accordingly provides a multi-interface terminal, and FIG. 4 is a schematic diagram of the structure of a multi-interface terminal in accordance with an embodiment of the present document, as shown in FIG. 4, the multi-interface terminal comprises: a service transmission request initiating module, a receiving module, a link establishing module, a service data packet dividing module and a transmitting module; wherein the service transmission request initiating module is configured to initiate a service transmission request to the network side, wherein the service transmission request carries at least the service ID of the requested service and the terminal ID of the multi-interface terminal;

the receiving module is configured to receive the information of the database servers capable of providing the requested service resources and the service information of the requested service from the network side; and receive the service data packets of the requested service over the plurality of concurrent links established by the link establishing module;

the link establishing module is configured to establish a plurality of concurrent links with all or some of database servers corresponding to the information of the database servers capable of providing the requested service resources according to the information of the database servers capable of providing the requested service resources;

the service data packet dividing module is configured to divide the service data packets of the requested service according to the service information of the requested service;

the transmitting module is configured to notify the network side of the division result of the service data packet dividing module.

Figure 5:
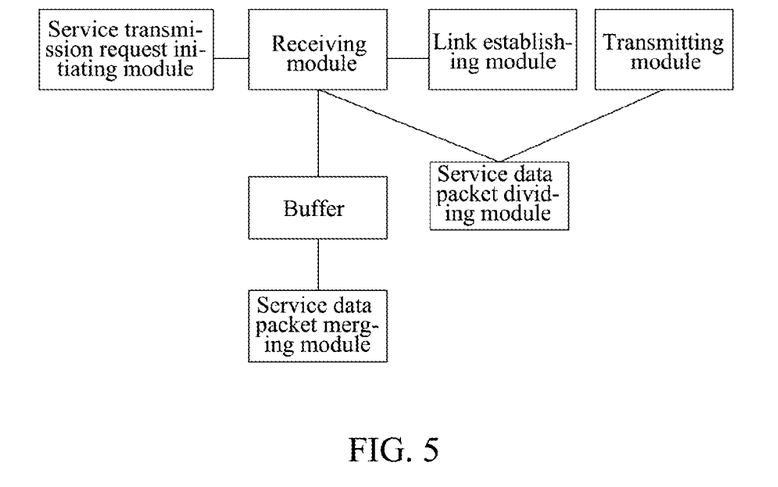
FIG. 5 is a schematic diagram of the structure of another multi-interface terminal in accordance with an embodiment of the present document.

Alternatively, as shown in FIG. 5, the multi-interface terminal further comprises: a buffer and a service data packet merging module; wherein the buffer is configured to buffer the service data packets received by the receiving module, and the service data packets carry the service sequence numbers; since for various interfaces of the multi-interface terminal device, there are differences between the service stream arrival rate and the ideal arrival rate due to the influence caused by the packet loss of radio link, delay, bandwidth and other factors, so the buffer is used to buffer and store the first-arrived services and submit them to the service data packet merging module to complete the service combination, and the buffer size can be set according to the resources of multi-interface terminal (size of the storage space, data processing capability and so on).

the service data packet merging module is configured to merge various service data packets according to the service sequence numbers of the various service data packets in the buffer, merge them into a complete service and present it to the user.

Figure 6:
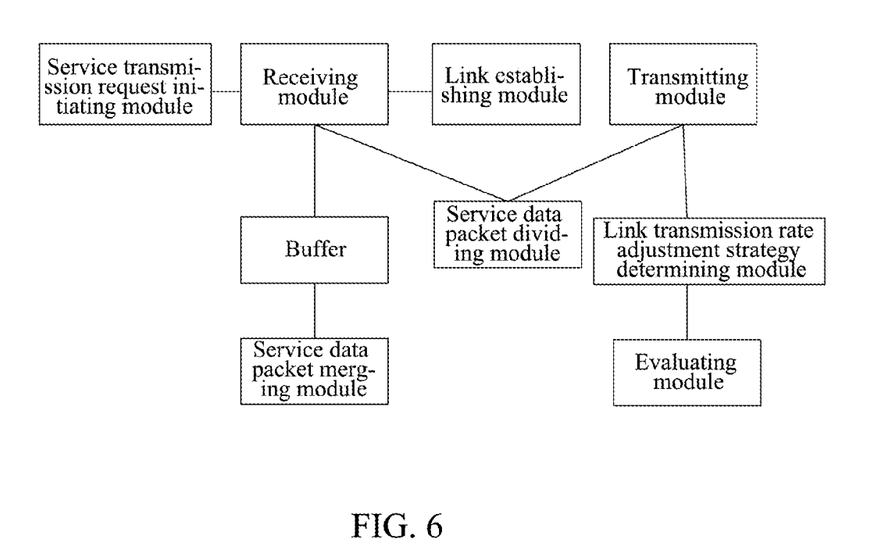
FIG. 6 is a schematic diagram of the structure of still another multi-interface terminal in accordance with an embodiment of the present document.

Alternatively, as shown in FIG. 6, the multi-interface terminal further comprises an evaluating module and a link transmission rate adjustment strategy determining module; wherein the evaluating module is configured to evaluate the links transmitting the service data packets; specifically, the evaluating module monitors the real-time statuses of various links performing service concurrent transmission, in particular, collecting and analyzing the situations of packet loss and delay caused by the link congestion to acquire the network link parameters, and evaluate the links by combining with the link channel evaluation algorithm;

the link transmission rate adjustment strategy determining module is configured to determine the link transmission rate adjustment strategy according to the evaluation result of the evaluating module, so as to achieve controlling the service stream arrival rate at various interfaces;

the transmitting module is further configured to notify the network side of the link transmission rate adjustment strategy determined by the link transmission rate adjustment strategy determining module.

Preferably, a link channel evaluation algorithm can be: achieving the load balance of the service in various transmission links by calculating the weight values of various concurrent links. The algorithm can dynamically generate the values of path weight according to the difference of path characteristics, and perform data scheduling in each path according to the value, specifically:

weight value:

$$\text{Weight} = \frac{\alpha}{B_i(t)} + \beta RTT_i(t) + \gamma Loss_i(t),$$

wherein $B_i(t)$ is the bandwidth estimation value of the link i at the time t, $RTT_i(t)$ is the average round-trip time delay of the link i at the time t, $Loss_i(t)$ is the retransmission statistical value of the link i at the time t, the coefficients $\alpha$, $\beta$ and $\gamma$ represent the preference of the transmitted service to the various performance parameters of the link as well as the service grade information, and they are generated by the fuzzy multi-attribute decision-making cooperating with the user strategy which has already been determined.

According to the value of SACK returned by the receiving end in the transport protocols (SCTP, MTCP and other transport protocols which support the multi-stream concurrent transmission), sample estimation can be performed on the bandwidth estimation value $B_i(t)$ as follows:

$$s_i(t) = \frac{O_i(t)}{\max(RTT_i, 50 \text{ ms})},$$

wherein $O_i(t)$ is the total amount of data transmitted from the time t−1 to the time t, to achieve the dynamic bandwidth estimation, the bandwidth value at the time t−1 is used to correct the bandwidth value at the time t:

$B_i(t)=\lambda B_i(t-1)+(1-\lambda)s_i(t)$, wherein $\lambda$ is the filtering factor.

The service data packets arrive at the transmitting end and are distributed to different links for data transmission through the values of parameters of the weights of various links, so as to maximize the utilization of network resources and achieve the optimal configuration of the network.

Figure 7:
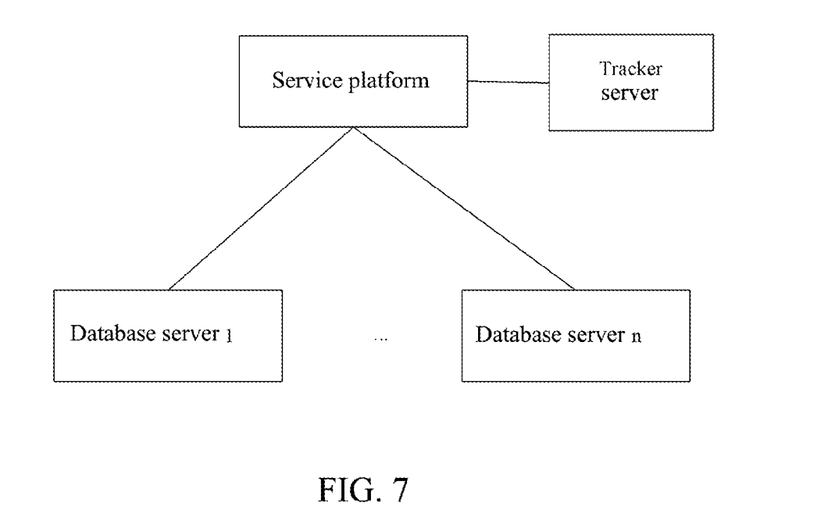
FIG. 7 is a schematic diagram of the structure of a multi-stream service concurrent transmission subsystem in accordance with an embodiment of the present document.
Figure 8:
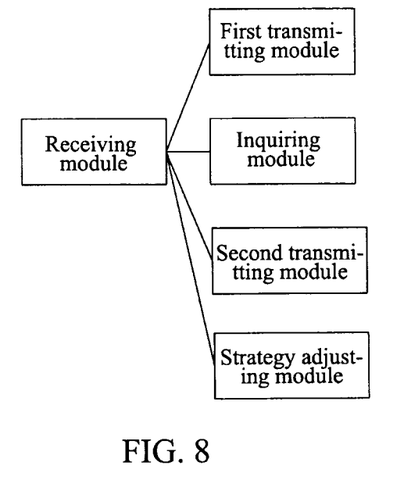
FIG. 8 is a schematic diagram of the structure of a service platform in accordance with an embodiment of the present document.
Figure 9:
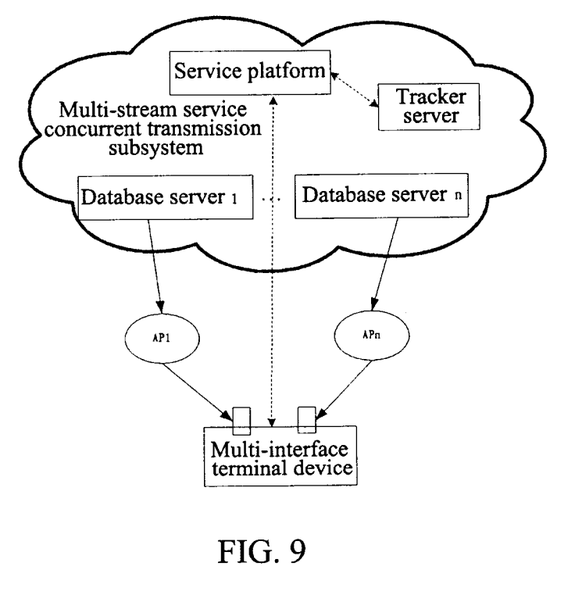
FIG. 9 is a schematic diagram of the structure of a multi-stream service concurrent transmission system in accordance with an embodiment of the present document.

The embodiment of the present document further accordingly provides a multi-stream service concurrent transmission subsystem, and FIG. 7 is a schematic diagram of the structure of a multi-stream service concurrent transmission subsystem in accordance with an embodiment of the present document, and as shown in FIG. 7, the multi-stream service concurrent transmission subsystem comprises: a service platform, a Tracker server and at least one database server; wherein as shown in FIG. 9, the service platform comprises: a receiving module, an inquiring module, a first transmitting module and a second transmitting module, wherein:

the receiving module is configured to receive a service transmission request from a multi-interface terminal, and receive a division result which comes from the multi-interface terminal by dividing the service data packets of the requested service;

the inquiring module is configured to inquire the Tracker server for information of the database servers capable of providing the service resources requested by the multi-interface terminal and the service information of the service requested by the multi-interface terminal according to the service ID, carried in the service transmission request, of the service requested by the multi-interface terminal;

the first transmitting module is configured to, according to the terminal ID carried in the service transmission request, return the information of the database servers capable of providing the service resources requested by the multi-interface terminal and the service information of the service requested by the multi-interface terminal to the corresponding multi-interface terminal;

the second transmitting module is configured to, together with various database servers which establish concurrent links with the multi-interface terminal, send the service data packets of the service resources requested by the multi-interface terminal to the multi-interface terminal according to the division result.

Alternatively, the service platform further comprises:

a strategy adjusting module, configured to control the related database servers to adjust the transmission rates of the corresponding links according to the link transmission rate adjustment strategy;

the receiving module, further configured to receive the link transmission rate adjustment strategy from the multi-interface terminal.

the Tracker server is configured to provide the information of the database servers of the service resources as well as the service information to the service platform; specifically, the Tracker server is responsible for tracking the situation of usage, including the number of threads which has been used, the number of available threads, a list of servers with the available resources and other information, of different service resources in various database servers.

The database server is the service provider or the operator's data center, and it stores the services required by the user and the related service information, and it is configured to provide service resources to the multi-interface terminal according to the notification from the service platform. It should be noted that, in order to meet the execution of service combination in the users' individual needs, there may be more than one database server providing services requested by the users.

The present document further correspondingly provides a multi-stream service concurrent transmission system, and FIG. 9 is a schematic diagram of the structure of a multi-stream service concurrent transmission system in accordance with an embodiment of the present document, and as shown in FIG. 9, the system comprises: a multi-interface terminal and a multi-stream service concurrent transmission subsystem; wherein the multi-interface terminal is the abovementioned multi-interface terminal;

the multi-stream service concurrent transmission subsystem is the abovementioned multi-stream service concurrent transmission subsystem.

In FIG. 9, the user's multi-interface terminal can access the same or different access networks via a plurality of access points, establish a plurality of transmission links with the core network server and perform concurrent service transmission in the plurality of links. The dotted line in FIG. 9 represents the interactive information stream, which is implemented as a data stream.

Figure 10:
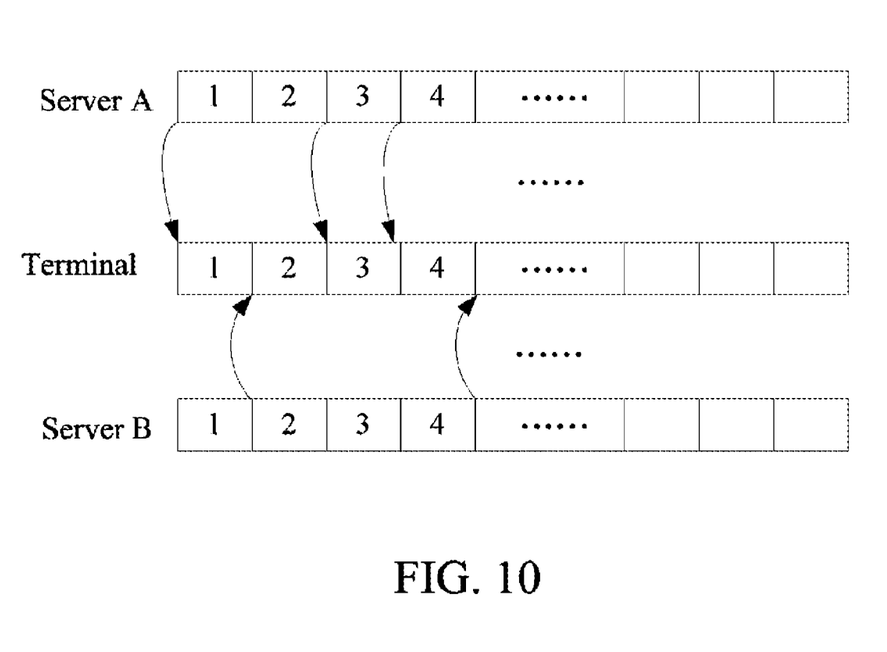
FIG. 10 is a schematic diagram of example of a service distribution transmission and aggregation in the present document.

FIG. 10 is a schematic diagram of an exemplary embodiment of a service distribution transmission and aggregation in the embodiment of the present document, as shown in FIG. 9, in this embodiment, the multi-interface terminal device establishes two communication links with the server A and the server B through two interfaces respectively, and FIG. 10 describes a possibility of two threads transmitting the service data packets. The thread A first starts to transmit the service data packet 1, then the thread B starts to transmit the service data packet 2, and the thread A transmits the service data packet 3. When the thread A transmits the service data packet 3 completely, the thread B still does not complete transmitting the service data packet 2, at this time the next service data packet 4 is continuously transmitted by the thread A, and so on, until the transmission of the all service data packets is completed.

It should be noted that, the technical scheme provided in the embodiment of the present document can be applied to achieve the scene of multi-stream service concurrent transmission during the process of providing collaborative services in ubiquitous network.

It can be seen that, the embodiments of the present document fully utilize the hybrid model file-sharing mode in the P2P technology and make full use of network resources in the premise of minimizing changes to the existing network structure, so as to achieve the multi-stream service concurrent transmission in the collaborative service transmission process, according to the abovementioned transmission method, the idle links can be utilized as much as possible, fully playing the advantages of combining multiple interfaces with multiple links. Eventually the multi-interface terminal aggregates each service data packets to obtain a complete service stream. The embodiment of the present document can make full use of network resources and enhance the service transmission efficiency in the premise of not changing the existing network architecture, and promptly adjust the link load so as to adjust the transmission strategy in real time according to the changes in the network environment, and ensures efficient and fast service transmission.

The above description is only preferred embodiments of the present document, and is not intended to limit the protection scope of the present document.

INDUSTRIAL APPLICABILITY

A multi-stream service concurrent transmission method, subsystem, system, and multi-interface terminal is provided in accordance with the embodiment of the present document, and the multi-interface terminal initiates a service transmission request to the network side, wherein the service transmission request carries at least the service ID of the requested service and the terminal ID of the multi-interface terminal; the multi-interface terminal receives the information of the database servers capable of providing the requested service resources as well as the service information of the requested service from the network side; the multi-interface terminal establishes a plurality of concurrent links with all or some of the database servers corresponding to the information of the database servers capable of providing the requested service resources according to the information of the database servers capable of providing the requested service resources, as well as divides the service data packets of the requested service according to the service information of the requested service, and notifies the network side of the division result; the multi-interface terminal receives the service data packets of the requested service over the plurality of established concurrent links. The embodiment of the present document performs traffic distribution transmission based on the decision of the multi-interface terminal side, and there is no need to add different functional entities aiming to different network architectures in the network side, therefore the universality is relatively high, moreover the multi-interface terminal side can promptly perceive changes in the multi-interface terminal environment and make timely response and strategy adjustment, therefore the robustness of distribution strategy is relatively high.

What is claimed is:

1. A multi-stream service concurrent transmission method, comprising:
   a multi-interface terminal initiating a service transmission request to a network side, wherein the service transmission request carries at least a service ID of requested service and a terminal ID of the multi-interface terminal;
   the multi-interface terminal receiving information of database servers capable of providing requested service resources and service information of the requested service from the network side;
   the multi-interface terminal establishing a plurality of concurrent links with all or some of database servers corresponding to the information of the database servers capable of providing the requested service resources according to the information of the database servers capable of providing the requested service resources, and dividing service data packets of the requested service according to the service information of the requested service, and notifying the network side of a division result;
   the multi-interface terminal receiving the service data packets of the requested service over the plurality of established concurrent links;
   the multi-interface terminal evaluating links which transmit the service data packets;
   the multi-interface terminal determining a link rate adjustment strategy according to a evaluation result, and notifying the network side of the link transmission rate adjustment strategy for the network side of the adjust transmission rates of various links;
   wherein the step of the multi-interface terminal evaluating the links transmitting the service data packets comprises:
   when the multi-interface terminal evaluating a link transmitting the service data packets at time t, calculating path weight of the link according to criteria comprising a bandwidth estimation value of the link at the time t, an average round-trip time delay of the link at the time t, and a retransmission statistical value of the link at the time t, wherein each of these criteria are further weighted by factors representing service grade information and the preference of transmitted service to various performance parameters of the link.

2. The method of claim 1, wherein after the multi-interface terminal receives the service data packets of the requested service over the plurality of established concurrent links, the method further comprises:
   the multi-interface terminal buffering the received service data packets in a buffer, wherein the service data packets carry service sequence numbers;
   the multi-interface terminal combining various service data packets according to the service serial numbers of the various service data packets in the buffer.

3. The method of claim 2, wherein the step of the multi-interface terminal dividing the service data packets of the requested service according to the service information of the requested service comprises:
   the multi-interface terminal dividing the service data packets according to one or more of following items: service size, service type, the number of concurrent links and buffer size.

4. The method of claim 1, wherein the step of the multi-interface terminal evaluating the links transmitting the service data packets comprises:
   calculating path weights of various links which transmits the service data packets according to $$\text{Weight} = \frac{\alpha}{B_i(t)} + \beta RTT_i(t) + \gamma Loss_i(t),$$

wherein $B_i(t)$ is a bandwidth estimation value of the link i at time t, $B_i(t)=\lambda B_i(t-1)+(1-\lambda)s_i(t)$, $$s_i(t) = \frac{O_i(t)}{\max(RTT_i, 50 \text{ ms})},$$

wherein $O_i(t)$ is a total amount of data sent from time t−1 to time t, and $\lambda$ is a filtering factor, and $RTT_i(t)$ is an average round-trip time delay of the link i at the time t, and $Loss_i(t)$ is a retransmission statistical value of the link i at the time t, and the coefficients $\alpha$, $\beta$ and $\gamma$ represent service grade information and the preference of transmitted service to various performance parameters of the link.

5. A multi-stream service concurrent transmission method, comprising:

a service platform receiving a service transmission request from a multi-interface terminal, and inquiring a Tracker server for information of database servers capable of providing service resources requested by the multi-interface terminal and service information of service requested by the multi-interface terminal according to a service ID, carried in the service transmission request, of the service requested by the multi-interface terminal;

the service platform returning the information of the database servers capable of providing the service resources requested by the multi-interface terminal as well as the service information of the service requested by the multi-interface terminal to a corresponding multi-interface terminal according to a terminal ID carried in the service transmission request;

the service platform receiving a division result which comes from the multi-interface terminal by dividing service data packets of the requested service;

the service platform controlling various database servers which establish concurrent links with the multi-interface terminal to send service data packets of the service resources requested by the multi-interface terminal to the multi-interface terminal according to the division result;

the service platform receiving a link transmission rate adjustment strategy from the multi-interface terminal;

the service platform controlling related database servers to adjust transmission rates of corresponding links according to the link transmission rate adjustment strategy;

wherein the receiving a link transmission rate adjustment strategy from the multi-interface terminal further comprises:

the multi-interface terminal evaluating a link transmitting the service data packets at time t, calculating path weight of the link according to criteria comprising a bandwidth estimation value of the link at the time t, and average round-trip time delay of the link at the time t, and a retransmission statistical value of the link at the time t, wherein each of these criteria are further weighted by factors representing service grade information and the preference of transmitted service to various performance parameters of the link.

6. A multi-interface terminal, comprising: a service transmission request initiating module, a receiving module, a link establishing module, a service data packet dividing module and a transmitting module; wherein the service transmission request initiating module is configured to initiate a service transmission request to a network side, wherein the service transmission request carries at least a service ID of requested service and a terminal ID of the multi-interface terminal;

the receiving module is configured to receive information of database servers capable of providing requested service resources and service information of requested service from a network side; and receive service data packets of the requested service via a plurality of concurrent links established by the link establishing module;

the link establishing module is configured to establish a plurality of concurrent links with all or some of database servers corresponding to the information of the database servers capable of providing the requested service resources according to the information of the database servers capable of providing the requested service resources;

the service data packet dividing module is configured to divide the service data packets of the requested service according to the service information of the requested service;

the transmitting module is configured to notify the network side of a division result of the service data packet dividing module;

wherein the mulit-interface terminal further comprises an evaluating module and a link transmission rate adjustment strategy determining module; wherein the evaluating module is configured to evaluate links transmitting the service data packets;

the link transmission rate adjustment strategy determining module is configured to determine a link transmission rate adjustment strategy according to an evaluation result of the evaluating module;

the transmitting module is further configured to notify the network side of the link transmission rate adjustment strategy determined by the link transmission rate adjustment strategy determining module;

wherein the evaluating module is configured to evaluate the links transmitting the service data packets, comprising:

the multi-interface terminal evaluating a link transmitting the service data packets at time t, calculating path weight of the link according to criteria comprising a bandwidth estimation value of the link at the time t, an average round-trip time delay of the link at the time t, and a retransmission statistical value of the link at the time t, wherein each of these criteria are further weighted by factors representing service grade information and the preference of transmitted service to various performance parameters of the link.

7. The multi-interface terminal of claim 6, wherein the multi-interface terminal further comprises: a buffer and a service data packet merging module; wherein the buffer is configured to buffer service data packets received by the receiving module, wherein the service data packets carry service sequence numbers;

the service data packet merging module is configured to merge various service data packets in accordance with the service sequence numbers of the various service data packets in the buffer.

8. The multi-interface terminal of claim 6, wherein the evaluating module is configured to evaluate the links transmitting the service data packets, comprising:

calculating path weights of various links which transmits the service data packets according to $$\text{Weight} = \frac{\alpha}{B_i(t)} + \beta RTT_i(t) + \gamma Loss_i(t),$$

wherein $B_i(t)$ is a bandwidth estimation value of the link i at time t, $B_i(t)=\lambda B_i(t-1)+(1-\lambda)s_i(t)$, $$s_i(t) = \frac{O_i(t)}{\max(RTT_i, 50 \text{ ms})},$$

wherein $O_i(t)$ is a total amount of data sent from time t−1 to time t, and λ is a filtering factor, and $RTT_i(t)$ is an average round-trip time delay of the link i at the time t, and $Loss_i(t)$ is a retransmission statistical value of the link i at the time t, and the coefficients α, β and γ represent the preference of transmitted service to various performance parameters of the link as well as service grade information.

9. The multi-interface terminal of claim 6, wherein the service data packet dividing module is configured to divide the service data packets of the requested service according to the service information of the requested service, comprising:

dividing the service data packets according to one or more of following items: service size, service type, the number of concurrent links and buffer size.

10. A service platform, comprising:

a receiving module, which is configured to receive a service transmission request from a multi-interface terminal, and receives a division result which comes from the multi-interface terminal by dividing service data packets of the requested service;

an inquiring module, configured to inquire a Tracker server for information of database servers capable of providing service resources requested by the multi-interface terminal and service information of service requested by the multi-interface terminal according to a service ID, carried in the service transmission request, of the service requested by the multi-interface terminal;

a first transmitting module, configured to, according to a terminal ID carried in the service transmission request, return the information of the database servers capable of providing the service resources requested by the multi-interface terminal and the service information of the service requested by the multi-interface terminal to a corresponding multi-interface terminal;

a second transmitting module, configured to, together with various database servers which establish concurrent links with the multi-interface terminal, send service data packets of the service resources requested by the multi-interface terminal to the multi-interface terminal according to the division result;

a strategy adjusting module, configured to control related database servers to adjust transmission rate of corresponding links according to the link transmission rate adjustment strategy;

the receiving module, further configured to receive the link transmission rate adjustment strategy from the multi-interface terminal;

wherein the evaluating module is configured to evaluate the links transmitting the service data packets, comprising:

the multi-interface terminal evaluating a link transmitting the service data packets at time t, calculating path weight of the link according to criteria comprising a bandwidth estimation value of the link at the time t, an average round-trip time delay of the link at the time t, and a retransmission statistical value of the link at the time t, wherein each of these criteria are further weighted by factors representing service grade information and the preference of transmitted service to various performance parameters of the link.

11. A multi-stream service concurrent transmission subsystem, comprising: the service platform of claim 10, a Tracker server and at least one database server; wherein the Tracker server is configured to provide service information and information of database servers of service resources to the service platform;

the database server is configured to provide the multi-interface terminal with the service resources according to a notification from the service platform.

* * * * *